June 16, 1953     R. J. IRELAND     2,641,885
TRANSPORT DEVICE FOR DISK HARROWS
Filed July 28, 1949     3 Sheets-Sheet 3
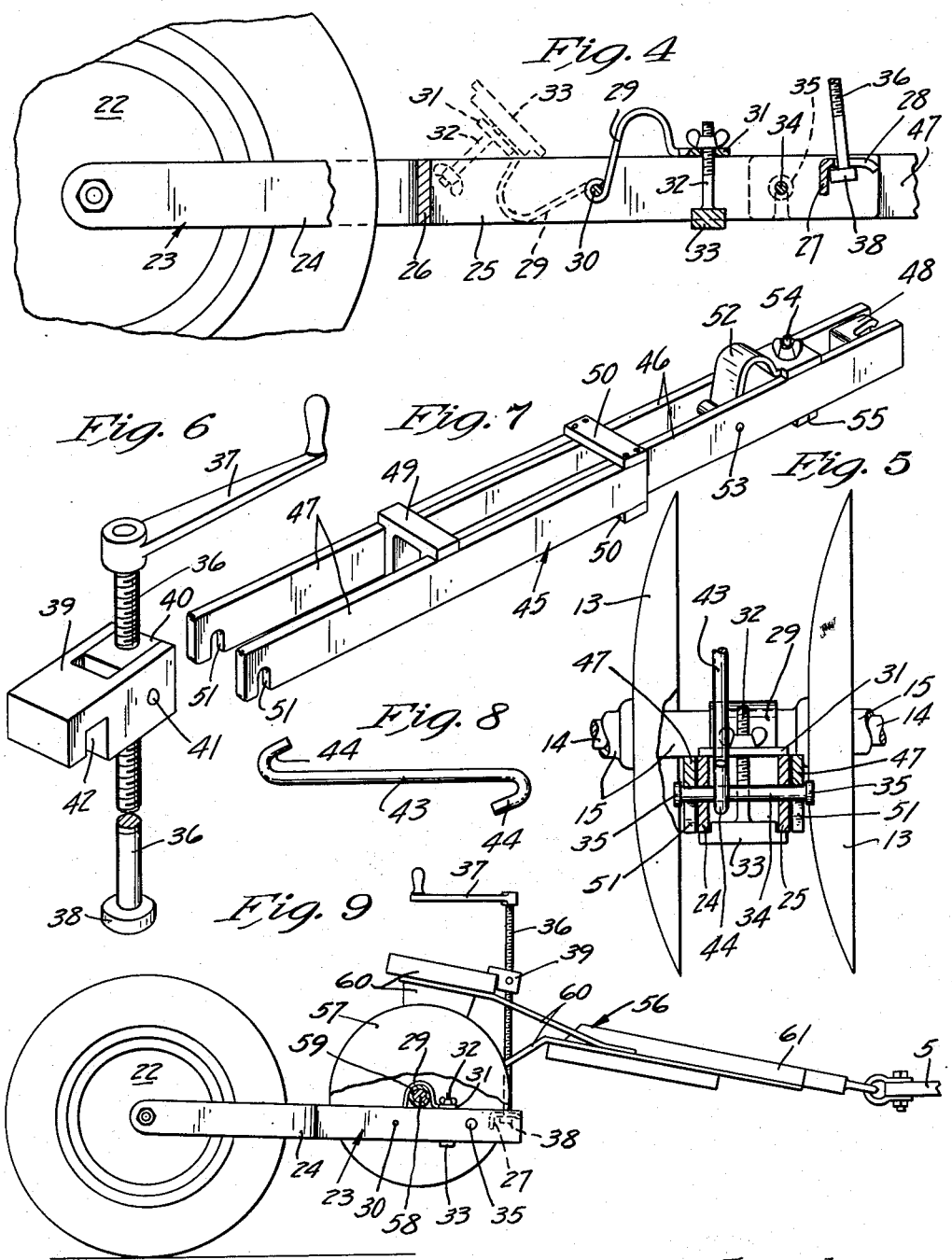
Inventor
Ralph J. Ireland
By his Attorneys
Merchant & Merchant Patented June 16, 1953

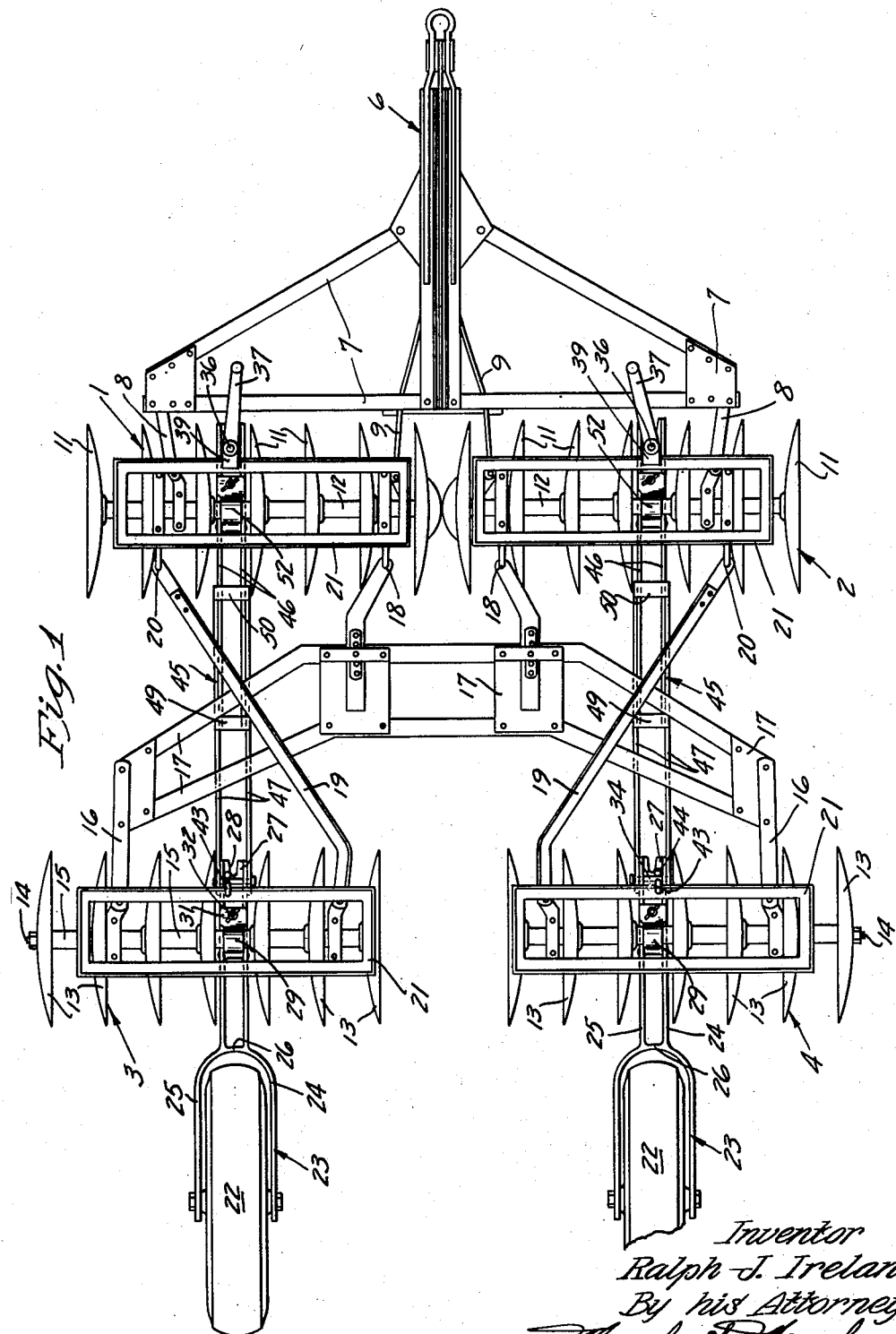

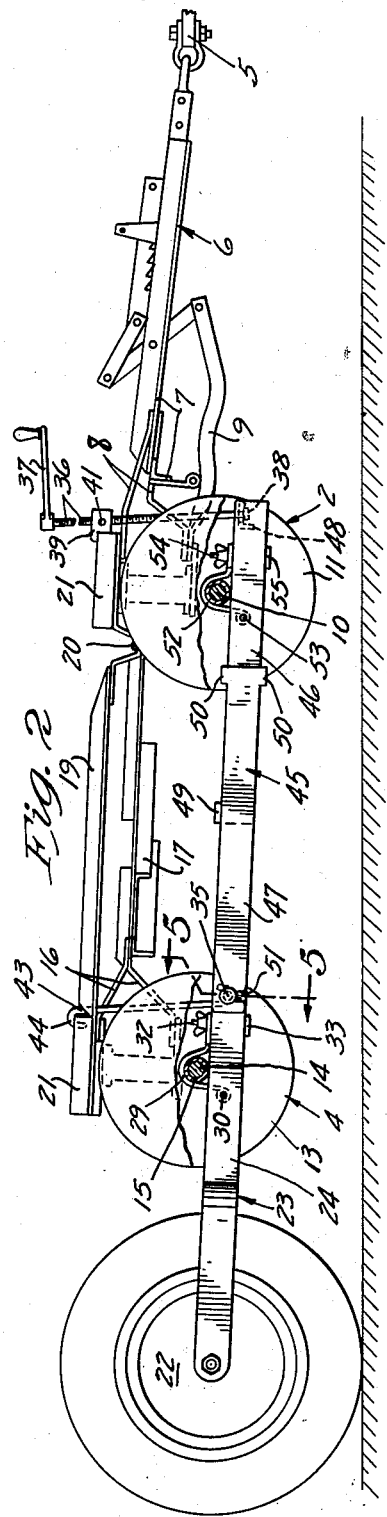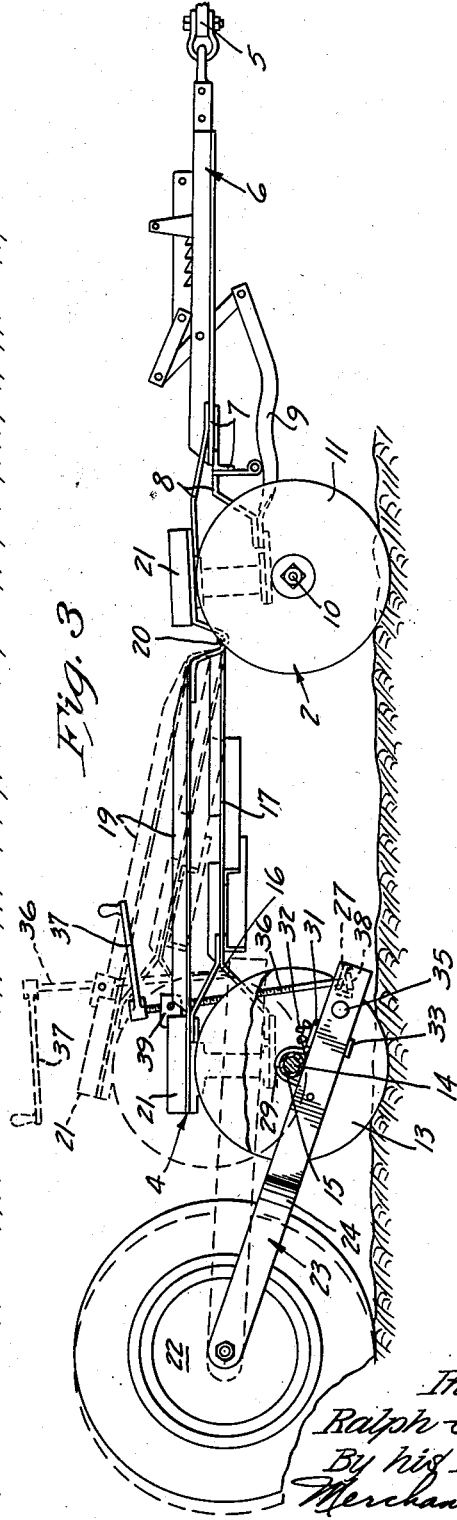

2,641,885

UNITED STATES PATENT OFFICE 2,641,885

TRANSPORT DEVICE FOR DISK HARROWS

Ralph J. Ireland, Mankato, Minn.

Application July 28, 1949, Serial No. 107,199

3 Claims. (Cl. 55—73)

My invention relates to trucks for transporting disk harrows to and from a field with the disks being held out of contact with the ground.

Heretofore, it has been necessary to place the harrow into a wagon or truck when transporting the same from the field to a place of storage or from one field to another, in order to prevent damage to the disks while in transit. Transporting harrows in this manner, particularly tandem disk harrows, is a very cumbersome task, the harrows being usually quite unwieldy and having considerable weight. An important object of my invention is, therefore, the provision of means which may be applied either to a single row disk harrow or one of the tandem variety for supporting the disks thereof above the ground while the harrow is attached to a tractor or like pulling means.

Another object of my invention is the provision of a harrow transport, as set forth, which may be adjusted to fit harrows of various sizes and types of manufacture.

Still another object of my invention is the provision of a harrow transport device, as set forth, which may be applied to and disconnected from a harrow by a single operator with a minimum of time and effort.

A still further object of my invention is the provision of a harrow transport device which is simple and inexpensive to build, which is efficient and flexible in operation and which is rugged in construction and durable in use.

The above and still further highly important objects and advantages will become apparent from the following detailed specification, appended claims and attached drawings.

Referring to the drawings, wherein like characters indicate like parts throughout the several views:

Fig. 1 is a plan of a tandem disk harrow illustrating the application of a preferred embodiment of the invention thereon, some parts being broken away;

Fig. 2 is a view in side elevation of the invention illustrated in Fig. 1, some parts being broken away and some parts shown in section;

Fig. 3 is a view corresponding to Fig. 2, but showing a different position of some of the parts;

Fig. 4 is an enlarged fragmentary view in side elevation of the rear end portion of my novel transport device, some parts being broken away and some parts shown in section;

Fig. 5 is an enlarged fragmentary detail taken substantially on the line 5—5 of Fig. 2;

Fig. 6 is a fragmentary perspective view of the elevating mechanism of my harrow transport;

Fig. 7 is a view in perspective of a supplemental supporting arm of my invention;

Fig. 8 is a view in side elevation of a tie bar made in accordance with my invention; and Fig. 9 is a view in side elevation, some parts being broken away and some parts being shown in section, of my invention utilized to transport a single disk harrow.

Referring particularly to the structure illustrated in Figs. 1 to 8, inclusive, a tandem disk harrow is shown as comprising front disk gang sections 1 and 2 and rear disk gang sections 3 and 4. The disk harrow illustrated is of the type commonly used and is adapted to be connected to the drawbar 5 of a conventional tractor or the like, not shown, by a tongue 6 extending forwardly of a rigid frame 7. The frame 7 is connected to the gang sections 1 and 2 by laterally outer arms 8 and inner arms 9, which, at their rear ends, are coupled to gang bolts or axle shafts 10. The gang bolts 10 each carry a plurality of harrow disks 11 which are spaced apart thereon by spacing sleeves or the like 12. The rear gang sections 3 and 4 include spaced harrow disks 13 mounted on gang bolts or axles 14 and spaced apart by spacing sleeves 15 and are connected by frame members 16 to the outer ends of a rigid transverse frame 17. Intermediate its ends, the frame 17 is loosely coupled to the front gang sections 1 and 2, as indicated at 18. Each of the gang sections 3 and 4 are coupled to gang sections 1 and 2, respectively, by rigid cross members 19. The cross members 19 are pivotally secured one each to the inner ends of one of the rear disc gangs 3 and 4 and at their forward ends are loosely coupled to the outer end portions of an adjacent one of the forward gang sections 1 and 2, as indicated at 20. Each disk gang 1 to 4, inclusive, is provided with a rigid rectangular frame 21 for carrying sand bags or other weights.

My novel harrow transport comprises a pneumatic tire-equipped ground-engaging wheel 22 journaled in the rear end of a frame 23 made up of a pair of laterally spaced generally parallel supporting arms 24 and 25. It will be seen, particularly by reference to Fig. 1, that the arms 24 and 25 are relatively close together at their forward portions and spread apart at their rear end portions to accommodate the wheel 22 therebetween. Immediately forward of the ground wheel 22, the arms 24 and 25 are joined by a cross member or spacer 26. At their front ends, the arms 24 and 25 are connected by a downwardly opening hook element 27 welded at its opposite sides to each thereof, and having a central longitudinally outwardly opening slot 28 therein.

A hook-like retaining element 29 has one end journaled on a pivot bolt 30 extending between the arms 24 and 25 intermediate the spacer 26 and hook 27. The retainer 29 is adapted to encompass one of the sleeves 15, as shown in Figs. 1 to 3, inclusive, and Fig. 5, and at its free end is provided with a laterally extended portion 31 which is adapted to span the upper edges of arms 24 and 25. A thumb nut-equipped screw or stud 32 is axially slidable through the central aperture in the portion 31 and has its lower end rigidly secured to an elongated clamping head 33 which may be turned at right angles to span the lower side edges of the supporting arms 24 and 25, whereby the retainer 29 may be clamped to said arms, as indicated in full lines in Fig. 4. When the thumb nut on the screw 32 is loosened, the clamping head 33 may be turned at right angles to the full line position in Fig. 4, to permit the retainer 29 to be swung about the axis of the pivot bolt 30 to its dotted line position of Fig. 4, whereby to be released from engagement with one of the sleeves 15 of the harrow. A shaft 34 extends laterally through the spaced arms 24 and 25 slightly to the rear of the harrow 29. The shaft 34 projects laterally outwardly from the arms 24 and 25 and terminates in head portions 35, for a purpose which will hereinafter become apparent.

In the raising of a rear gang section of a tandem disk harrow preparatory to the transporting thereof, the supporting arm 23 is placed between a pair of adjacent disks 13 and the hook-like retainer 29 is brought into retaining engagement with the spacing sleeve 15 therebetween, as shown by full lines in Fig. 3. For raising the rear gang section, I provide an elongated screw element 36 provided at its upper end with a handle-equipped crank 37 and at its lower end with an enlarged head 38. A traveller 39 adapted to move upwardly and downwardly with respect to the head 38, upon rotation of the screw 36, includes a nut element 40 having threaded engagement with the screw 36 and mounted in the traveller 39 for pivotal movements on a pivot pin 41, the axis of which is at right angles to the axis of the screw 36. The traveller 39 has a downwardly open hook 42 which is adapted to engage a portion of the frame 21 of a rear gang section, see Fig. 3. Rotation of the screw 36 in one direction causes the head 38 to move toward the traveller 39 whereby to shorten the distance between the extreme forward end of the supporting arm 23 and the frame 21 and raise the disk gang from the full line position of Fig. 3 to the position thereof shown by dotted lines in Fig. 3. For maintaining the disk gang in its elevated positions, I provide a supporting hook or tie bar, illustrated in Fig. 8, and indicated by the numeral 43. The tie bar 43 has its hook portions 44 at its opposite ends, one of which is adapted to be hooked over the frame 21 adjacent the traveller 39 and the other of which hooks under the shaft 34, as indicated in Figs. 2 and 5. When the tie bar 43 is thus put in place, the screw 36 and traveller 39 may be removed from the gang and utilized in connection with a second transport device on the opposite gang section.

For raising a forward gang section of the end disk harrow, I provide a supplemental supporting arm 45 comprising front and rear telescoping arm sections 46 and 47, respectively. The forward arm section 46 includes a pair of laterally spaced bars tied together at their front ends by a slotted hook 48 welded or otherwise rigidly secured thereto and identical with the hook 27 of the supporting arm 23. The bars comprising the arm section 46 are rigidly connected at their rear ends by a transverse bar or plate 49 welded thereto and projecting laterally outwardly from each thereof. The rear supplemental arm section 47 includes a pair of spaced parallel bars connected at their front ends by a pair of connector plates 50. By reference to Fig. 7, it will be seen that the forward arm section 46 is telescopically slidably received between the bars forming the rear section 47 and between the upper and lower plates 50, the transverse plate 49 of the arm 46 resting upon the upper side edges of the arm section 47. At their rear ends, the parallel bars forming the rear arm section 47 are provided with aligned downwardly opening slots 51 that are adapted to receive the outer end portions of the shaft 34 intermediate the heads 35 thereon and the supporting bars 24 and 25 of the supporting arm 23. (See Figs. 2, 4 and 5.) It should be noted that the bars comprising the forward arm section 46 are spaced apart equal to the spacing of the bars 24 and 25 of the arm 23, so that the rear ends of the arm section 46 lie immediately laterally outwardly of the forward ends of the bars 24 and 25.

A hook-like retaining element 52 is journaled on a shaft 53 extending transversely between the bars of the supplemental arm section 46 and is provided with a thumb-nut-equipped screw 54 and a clamping head 55. The retaining element 52 is located in rearwardly spaced relation to the slotted hook 48 and is identical to the retaining element 29 of the arm 23.

When one of the rear gang sections 3 or 4 has been raised to the dotted line position of Fig. 3 and the tie bar 43 applied thereto, as indicated in Fig. 2, the supplemental arm 45 is then connected to the front end of the arm 23 by the shaft and slot connection 34—51 and the hook-like retaining element 52 placed over a spacing sleeve 12 of the corresponding front gang section 1 or 2 and securely locked in place. The screw 36 and traveller 39 are then applied to the slotted hook 48 and the frame 21 and the crank 37 manipulated to draw the head 38 in the direction of the traveller 39, thus raising the front gang section, as indicated in Fig. 2. It is important to note that a separate wheel-equipped supporting arm 23 is used for each of the rear gang sections and that a separate supplemental arm 45 is used in connection with each thereof to raise the front gang sections of the harrow. As indicated in Fig. 1, I utilize a pair of traveller-equipped screws 36, one for each transport device. However, if desired, a single screw 36 may be used to elevate all of the gang sections. In that event, a third tie bar 43 must be utilized to support one of the front gang sections. As shown from the above, it should be obvious that the screws 36 remain in place on the front gang sections during transportation of the harrow. The telescoping arrangement of the supplemental arm sections 46 and 47 permits use of my novel transport device on harrows built by different manufactures and of various sizes, and application thereof to a disk harrow or removal therefrom may be accomplished in a very short time and with little effort.

Fig. 9 of the drawings illustrates the application of my novel device to a single row disk harrow. In transporting this type of harrow, use of the supplemental supporting arm 45 and the hook-equipped tie bars 43 are dispensed with, it being only necessary to use the wheel-equipped supporting arm 23 and the elevating screw 36 and traveller 39. A single row disk harrow is indicated in its entirety by 56 and comprises a plurality of laterally spaced disks 57 on an axle 58, spacing sleeves 59, a rigid frame 60, and a tongue 61 adapted to be connected to the drawbar 5. Obviously, a pair of the wheel-equipped supporting arms 23 are utilized in this case, one each on opposite sides laterally outwardly of the central tongue 61.

My invention has been thoroughly tested and found to be adequate for the accomplishment of the objectives set forth and while I have illustrated a preferred form of the device, it will be understood that the same is capable of modification within the scope and spirit of the invention as defined in the claims.

What I claim is:

1. A transport for disk harrows comprising a supporting arm, a wheel journalled to one end of said arm, a harrow axle retaining element intermediate the ends of said arm, an elongated clamping element having a head on its lower end, means on the free end of said supporting arm for detachably receiving said head, and an adjustable traveller on said clamping element, said traveller having a downwardly-opening hook element adapted to receive therein a portion of the harrow frame upwardly of said axle, said arm comprising a pair of laterally-spaced supporting bars, said retaining element including a hook pivotally secured at one end intermediate said bars and a nut-equipped clamping screw carried by the free end of said hook, said hook at its free end being provided with an enlarged head which overlies the upper surface of said bars, and said screw being provided with an elongated head which in one position is adapted to underlie said bars and in another position is adapted to pass freely between said bars.

2. A transport for disk harrows comprising a supporting arm, a wheel journalled to one end of said arm, a harrow axle retaining element intermediate the ends of said arm, an elongated clamping element having a head on its lower end, means on the free end of said supporting arm for detachably receiving said head, an adjustable traveller on said clamping element, said traveller having a downwardly-opening hook element adapted to receive therein a portion of the harrow frame upwardly of said axle, said supporting arm adjacent its forward end being provided with a transversely projected stub shaft, a supplemental supporting arm for supporting a forward gang section of a tandem disk harrow, said arm being notched adjacent its rear end to receive therein said stub shaft, the forward end of said supplemental arm being provided with a hook element having a forwardly-opening slot adapted to receive said clamping element immediately above the head thereof, and a retaining element pivotally secured to said supplemental supporting arm behind said hook element, said retaining element being adapted to engage the axle portion of said forward gang section.

3. A transport for disk harrows comprising a supporting arm, a wheel journalled to one end of said arm, a harrow axle retaining element intermediate the ends of said arm, an elongated clamping element having a head on its lower end, means on the free end of said supporting arm for detachably receiving said head, and an adjustable traveller on said clamping element, said traveller having a downwardly opening hook element adapted to receive therein a portion of the harrow frame upwardly of said axle, said clamping element being in the nature of a screw having a crank at its upper end and said means for receiving said head being in the nature of a hook element having therein a laterally-opening slot adapted to receive said screw immediately above said head.

RALPH J. IRELAND.

References Cited in the file of this patent

UNITED STATES PATENTS

| Number | Name | Date |
|---|---|---|
| 1,025,767 | Waterman | May 7, 1912 |
| 1,481,049 | Cason | Jan. 15, 1924 |
| 1,619,904 | Wenndt | Mar. 8, 1927 |
| 1,620,247 | Watters | Mar. 8, 1927 |
| 1,901,183 | McKahin | Mar. 14, 1933 |
| 2,271,713 | Raska | Feb. 3, 1942 |
| 2,476,188 | Griffin | July 12, 1949 |
| 2,521,266 | Swisher | Sept. 5, 1950 |